(12) United States Patent
Khoshnevisan et al.

(10) Patent No.: US 10,548,020 B2
(45) Date of Patent: Jan. 28, 2020

(54) TECHNIQUES FOR SELECTIVELY ADJUSTING WIRELESS COMMUNICATION PARAMETERS BASED ON AGGREGATED INTERFERENCE FROM LISTEN-BEFORE-TALK WIRELESS DEVICES

(71) Applicant: QUALCOMM Incorporated, San Diego, CA (US)

(72) Inventors: Mostafa Khoshnevisan, San Diego, CA (US); Farhad Meshkati, San Diego, CA (US); Tamer Kadous, San Diego, CA (US); Mehmet Yavuz, San Diego, CA (US); Chirag Sureshbhai Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 15/810,963

(22) Filed: Nov. 13, 2017

(65) Prior Publication Data

US 2018/0139616 A1 May 17, 2018

Related U.S. Application Data

(60) Provisional application No. 62/421,814, filed on Nov. 14, 2016.

(51) Int. Cl.
*H04W 16/14* (2009.01)
*H04L 1/16* (2006.01)
(Continued)

(52) U.S. Cl.
CPC ........... *H04W 16/14* (2013.01); *H04W 88/08* (2013.01); *H04B 1/7097* (2013.01);
(Continued)

(58) Field of Classification Search
CPC . H04W 16/14; H04W 84/12; H04W 74/0808; H04W 88/08; H04W 28/18;
(Continued)

(56) References Cited

U.S. PATENT DOCUMENTS

2004/0204907 A1* 10/2004 Gutowski ............ H04B 1/7097
702/182
2011/0070838 A1 3/2011 Caulfield
(Continued)

FOREIGN PATENT DOCUMENTS

WO WO-2017071647 A1 5/2017

OTHER PUBLICATIONS

Intel Corporation: "Considerations on the Impact of Unlicensed Access to 5G Design", 3GPP Draft; R2-165003, 3rd Generation Partnership Project (3GPP), Mobile Competence Centre: 650, Route Des Lucioles; F-06921 Sophia-Anti Polls Cedex; France, vol. RAN WG2, No. Gotenburg, Sweden; Aug. 21, 2016, XP051126644, Retrieved from the Internet: URL:http://www.3gpp.org/ftp/Meetings_3GPP_SYNC/RAN2/Docs/ [retrieved on Aug. 21, 2016], 4 pages.
(Continued)

*Primary Examiner* — Kiet Tang
(74) *Attorney, Agent, or Firm* — Holland & Hart LLP

(57) ABSTRACT

One method includes identifying a listen-before-talk (LBT) silencing criterion between each pair of wireless devices in a plurality of wireless devices; dividing the plurality of wireless devices into a plurality of independent sets based at least in part on the identified LBT silencing criterions; determining, for a location, an aggregated interference value for each independent set; determining an aggregated interference value for the location based at least in part on the determined aggregated interference values for each independent set; and selectively adjusting a wireless communication parameter of at least one of the wireless devices to alter the aggregated interference value for the location.

20 Claims, 9 Drawing Sheets

(51) Int. Cl.
  *H04B 1/7097* (2011.01)
  *H04W 88/08* (2009.01)
  *H04L 5/00* (2006.01)
  *H04W 72/04* (2009.01)
  *H04W 84/12* (2009.01)

(52) U.S. Cl.
  CPC ........... *H04L 5/0007* (2013.01); *H04W 72/04* (2013.01); *H04W 84/12* (2013.01)

(58) Field of Classification Search
  CPC ............... H04W 72/04; H04J 11/0026; H04B 2201/709709; H04B 1/7097; H04L 5/001; H04L 5/0073; H04L 5/0007
  See application file for complete search history.

(56) References Cited

U.S. PATENT DOCUMENTS

| | | | |
|---|---|---|---|
| 2013/0336155 A1 | 12/2013 | Jantti et al. | |
| 2015/0215949 A1* | 7/2015 | Gormley | H04W 16/14 370/252 |
| 2016/0309354 A1 | 10/2016 | Yerramalli et al. | |
| 2019/0007972 A1* | 1/2019 | Gou | H04L 1/16 |

OTHER PUBLICATIONS

International Search Report and Written Opinion—PCT/US2017/061460—ISA/EPO—dated Feb. 13, 2018 (170818WO).

Kim D.I., et al., "Joint Rate and Power Allocation for Cognitive Radios in Dynamic Spectrum Access Environment", IEEE Transactions on Wireless Communications, IEEE Service Center, Piscataway, NJ, US, vol. 7, No. 12, Dec. 1, 2008, pp. 5517-5527, XP011364010, ISSN: 1536-1276, DOI: 10.1109/T-WC.2008.071465.

LG Electronics: "LBT schemes in LAA UL", R1-160630, 3rd Generation Partnership Project (3GPP), Mobile Competence Centre; 650, Route Des Lucioles; F-06921 Sophia-Anti Polls Cedex; France, vol. RAN WG1, No. St Julian's, Malta; Feb. 14, 2016, XP051053959, Retrieved from the Internet: URL:http://www.3gpp.org/ftp/Meetings_3GPP_SYNC/RAN1/Docs/, 10 pages.

Samsung: "Shared Spectrum Support for 5G New Radio Interface", 3GPP Draft; R1-162188, 3rd Generation Partnership Project (3GPP), Mobile Competence Centre; 650, Route Des Lucioles; F-06921 Sophia-Anti Polls Cedex; France, vol. RAN WG1, No. Susan, Korea; Apr. 1, 2016, XP051079822, Retrieved from the Internet: URL:http://www.3gpp.org/ftp/tsg_ran/WG1_RL1/TSGR1_84b/Docs/ [retrieved on Apr. 1, 2016], 3 pages.

* cited by examiner

TECHNIQUES FOR SELECTIVELY ADJUSTING WIRELESS COMMUNICATION PARAMETERS BASED ON AGGREGATED INTERFERENCE FROM LISTEN-BEFORE-TALK WIRELESS DEVICES

CROSS REFERENCES

The present Application for Patent claims priority to U.S. Provisional Patent Application No. 62/421,814 by Khoshnevisan et al., entitled "Techniques For Selectively Adjusting Wireless Communication Parameters Based On Aggregated Interference From Listen-Before-Talk Wireless Devices," filed Nov. 14, 2016, assigned to the assignee hereof, and which is hereby expressly incorporated by reference herein in its entirety.

BACKGROUND

Field of the Disclosure

The present disclosure, for example, relates to wireless communication systems, and more particularly to techniques for selectively adjusting wireless communication parameters based on aggregated interference from listen-before-talk (LBT) wireless devices.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, 5G, or new radio (NR) network, a network access device may take the form of a smart radio head (RH) or access node controller (ANC), with a set of smart radio heads in communication with an ANC defining a gNodeB (gNB). In a wireless local area network (WLAN), a network access device may take the form of a WLAN access point. A network access device may communicate with a UE on downlink channels (e.g., for transmissions from the network access device to the UE) and uplink channels (e.g., for transmissions from the UE to the network access device).

Some modes of communication may enable communication between a network access device and a UE over a shared radio frequency spectrum, or over different radio frequency spectrums (e.g., a dedicated radio frequency spectrum and a shared radio frequency spectrum). With increasing data traffic in cellular networks that use a dedicated radio frequency spectrum (e.g., a licensed radio frequency spectrum), offloading of at least some data traffic to a shared radio frequency spectrum may provide a mobile network operator (or cellular operator) with opportunities for enhanced data transmission capacity. Use of a shared radio frequency spectrum may also provide service in areas where access to a dedicated radio frequency spectrum is unavailable.

SUMMARY

Within a geographic area, there may be a plurality of wireless devices that share a shared radio frequency spectrum. The wireless devices may be associated with network operators, users, or device types having different priorities with respect to one another (e.g., different priorities for accessing the shared radio frequency spectrum). Also or alternatively within the geographic area, there may be locations or devices (e.g., wireless devices) having limits on the aggregated interference that wireless devices (or other wireless devices) can impart on the locations or devices. The techniques described in the present disclosure provide for selective adjustment of wireless communication parameters of wireless devices, based on the aggregated interference imparted by the wireless devices on a location or device. Adjustment of the wireless communication parameters may alter the aggregated interference at the location or device.

In one example, a method for wireless communication is described. The method may include identifying an LBT silencing criterion between each pair of wireless devices in a plurality of wireless devices; dividing the plurality of wireless devices into a plurality of independent sets based at least in part on the identified LBT silencing criterions; determining, for a location, an aggregated interference value for each independent set; determining an aggregated interference value for the location based at least in part on the determined aggregated interference values for each independent set; and selectively adjusting a wireless communication parameter of at least one of the wireless devices to alter the aggregated interference value for the location.

In some examples of the method, the LBT silencing criterion may be a binary parameter indicating a potential for LBT silencing between a pair of wireless devices or no potential for LBT silencing between the pair of wireless devices. In some examples, the LBT silencing criterion may be based on at least one of a transmit power of each wireless device in a pair of wireless devices, a radio frequency (RF) distance between the wireless devices in the pair of wireless devices, at least one LBT parameter of each wireless device in the pair of wireless devices, or a combination thereof. In some examples, the at least one LBT parameter may include at least one of an energy detection (ED) threshold, a preamble detection capability, or a combination thereof. In some examples, the identified LBT silencing criterions may include at least one of non-directional LBT silencing criterions, directional LBT silencing criterions, or a combination thereof. In some examples, the wireless communication parameter of the at least one of the wireless devices may include at least one of an ED threshold, a transmit power, a usable frequency range, or a combination thereof.

In one example, an apparatus for wireless communication is described. The apparatus may include means for identifying an LBT silencing criterion between each pair of wireless devices in a plurality of wireless devices; means for dividing the plurality of wireless devices into a plurality of independent sets based at least in part on the identified LBT silencing criterions; means for determining, for a location, an aggregated interference value for each independent set; means for determining an aggregated interference value for the location based at least in part on the determined aggregated interference values for each independent set; and means for selectively adjusting a wireless communication parameter of at least one of the wireless devices to alter the aggregated interference value for the location.

In some examples of the apparatus, the LBT silencing criterion may be a binary parameter indicating a potential for LBT silencing between a pair of wireless devices or no potential for LBT silencing between the pair of wireless devices. In some examples, the LBT silencing criterion may be based on at least one of a transmit power of each wireless device in a pair of wireless devices, an RF distance between the wireless devices in the pair of wireless devices, at least one LBT parameter of each wireless device in the pair of wireless devices, or a combination thereof. In some examples, the at least one LBT parameter may include at least one of an ED threshold, a preamble detection capability, or a combination thereof. In some examples, the identified LBT silencing criterions may include at least one of non-directional LBT silencing criterions, directional LBT silencing criterions, or a combination thereof. In some examples, the wireless communication parameter of the at least one of the wireless devices may include at least one of an ED threshold, a transmit power, a usable frequency range, or a combination thereof.

In one example, another apparatus for wireless communication is described. The apparatus may include a processor, memory in electronic communication with the processor, and instructions stored in the memory. The instructions may be executable by the processor to identify an LBT silencing criterion between each pair of wireless devices in a plurality of wireless devices; to divide the plurality of wireless devices into a plurality of independent sets based at least in part on the identified LBT silencing criterions; to determine, for a location, an aggregated interference value for each independent set; to determine an aggregated interference value for the location based at least in part on the determined aggregated interference values for each independent set; and to selectively adjust a wireless communication parameter of at least one of the wireless devices to alter the aggregated interference value for the location.

In some examples of the apparatus, the LBT silencing criterion may be a binary parameter indicating a potential for LBT silencing between a pair of wireless devices or no potential for LBT silencing between the pair of wireless devices. In some examples, the LBT silencing criterion may be based on at least one of a transmit power of each wireless device in a pair of wireless devices, an RF distance between the wireless devices in the pair of wireless devices, at least one LBT parameter of each wireless device in the pair of wireless devices, or a combination thereof. In some examples, the at least one LBT parameter may include at least one of an ED threshold, a preamble detection capability, or a combination thereof. In some examples, the identified LBT silencing criterions may include at least one of: non-directional LBT silencing criterions, directional LBT silencing criterions, or a combination thereof. In some examples, the wireless communication parameter of the at least one of the wireless devices comprises at least one of an ED threshold, a transmit power, a usable frequency range, or a combination thereof.

In one example, a computer program product including a non-transitory computer-readable medium is described. The non-transitory computer-readable medium may include instructions to identify an LBT silencing criterion between each pair of wireless devices in a plurality of wireless devices; instructions to divide the plurality of wireless devices into a plurality of independent sets based at least in part on the identified LBT silencing criterions; instructions to determine, for a location, an aggregated interference value for each independent set; instructions to determine an aggregated interference value for the location based at least in part on the determined aggregated interference values for each independent set; and instructions to selectively adjust a wireless communication parameter of at least one of the wireless devices to alter the aggregated interference value for the location.

In one example, another method for wireless communication is described. The method may include identifying a shared radio frequency spectrum occupancy parameter for each wireless device in a plurality of wireless devices; identifying, for a location, an actual interference value from each wireless device in the plurality of wireless devices, wherein the actual interference value from a wireless device is based on the wireless device being in a transmit mode; determining an average aggregated interference value for the location based at least in part on the identified shared radio frequency spectrum occupancy parameters and the identified actual interference values; and selectively adjusting a wireless communication parameter of at least one of the wireless devices, to alter the average aggregated interference value for the location.

In some examples of the method, determining the average aggregated interference value for the location may include multiplying, for each wireless device in the plurality of wireless devices, the identified shared radio frequency spectrum occupancy for a wireless device and the identified actual interference value from the wireless device to generate a product for the wireless device; and adding the generated products for the plurality of wireless devices. In some examples, the method may include receiving the shared radio frequency spectrum occupancy parameters from the plurality of wireless devices. In some examples, the wireless communication parameter of the at least one of the wireless devices may include at least one of an ED threshold, a transmit power, a usable frequency range, or a combination thereof.

In one example, another apparatus for wireless communication is described. The apparatus may include means for identifying a shared radio frequency spectrum occupancy parameter for each wireless device in a plurality of wireless devices; means for identifying, for a location, an actual interference value from each wireless device in the plurality of wireless devices, wherein the actual interference value from a wireless device is based on the wireless device being in a transmit mode; means for determining an average aggregated interference value for the location based at least in part on the identified shared radio frequency spectrum occupancy parameters and the identified actual interference values; and means for selectively adjusting a wireless communication parameter of at least one of the wireless devices, to alter the average aggregated interference value for the location.

In some examples of the apparatus, the means for determining the average aggregated interference value for the location may include means for multiplying, for each wireless device in the plurality of wireless devices, the identified shared radio frequency spectrum occupancy for a wireless device and the identified actual interference value from the wireless device to generate a product for the wireless device; and means for adding the generated products for the plurality of wireless devices. In some examples, the apparatus may include means for receiving the shared radio frequency spectrum occupancy parameters from the plurality of wireless devices. In some examples, the wireless communication parameter of the at least one of the wireless devices may include at least one of an ED threshold, a transmit power, a usable frequency range, or a combination thereof.

In one example, another apparatus for wireless communication is described. The apparatus may include a processor, memory in electronic communication with the processor, and instructions stored in the memory. The instructions may be executable by the processor to identify a shared radio frequency spectrum occupancy parameter for each wireless device in a plurality of wireless devices; to identify, for a location, an actual interference value from each wireless device in the plurality of wireless devices, wherein the actual interference value from a wireless device is based on the wireless device being in a transmit mode; to determine an average aggregated interference value for the location based at least in part on the identified shared radio frequency spectrum occupancy parameters and the identified actual interference values; and to selectively adjust a wireless communication parameter of at least one of the wireless devices, to alter the average aggregated interference value for the location.

In some examples of the apparatus, the instructions executable by the processor to determine the average aggregated interference value for the location may include instructions executable by the processor to multiply, for each wireless device in the plurality of wireless devices, the identified shared radio frequency spectrum occupancy for a wireless device and the identified actual interference value from the wireless device to generate a product for the wireless device; and to add the generated products for the plurality of wireless devices. In some examples, the instructions may be executable by the processor to receive the shared radio frequency spectrum occupancy parameters from the plurality of wireless devices. In some examples, the wireless communication parameter of the at least one of the wireless devices may include at least one of an ED threshold, a transmit power, a usable frequency range, or a combination thereof.

In one example, a computer program product including a non-transitory computer-readable medium is described. The non-transitory computer-readable medium may include instructions to identify a shared radio frequency spectrum occupancy parameter for each wireless device in a plurality of wireless devices; instructions to identify, for a location, an actual interference value from each wireless device in the plurality of wireless devices, wherein the actual interference value from a wireless device is based on the wireless device being in a transmit mode; instructions to determine an average aggregated interference value for the location based at least in part on the identified shared radio frequency spectrum occupancy parameters and the identified actual interference values; and instructions to selectively adjust a wireless communication parameter of at least one of the wireless devices, to alter the average aggregated interference value for the location.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which a shared radio frequency spectrum is used for at least a portion of communications in a wireless communication system. In some examples, the shared radio frequency spectrum may be used for Long Term Evolution (LTE) or LTE-Advanced (LTE-A) communications, Licensed Assisted Access (LAA) communications, enhanced LAA (eLAA) communications, or MuLTEfire communications. The shared radio frequency spectrum may be used in combination with, or independent from, a dedicated radio frequency spectrum. The dedicated radio frequency spectrum may include a radio frequency spectrum licensed to particular users for particular uses. The shared radio frequency spectrum may include a radio frequency spectrum available for Wi-Fi use, a radio frequency spectrum available for use by different radio access technologies, or a radio frequency spectrum available for use by multiple mobile network operators (MNOs) in an equally shared or prioritized manner.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
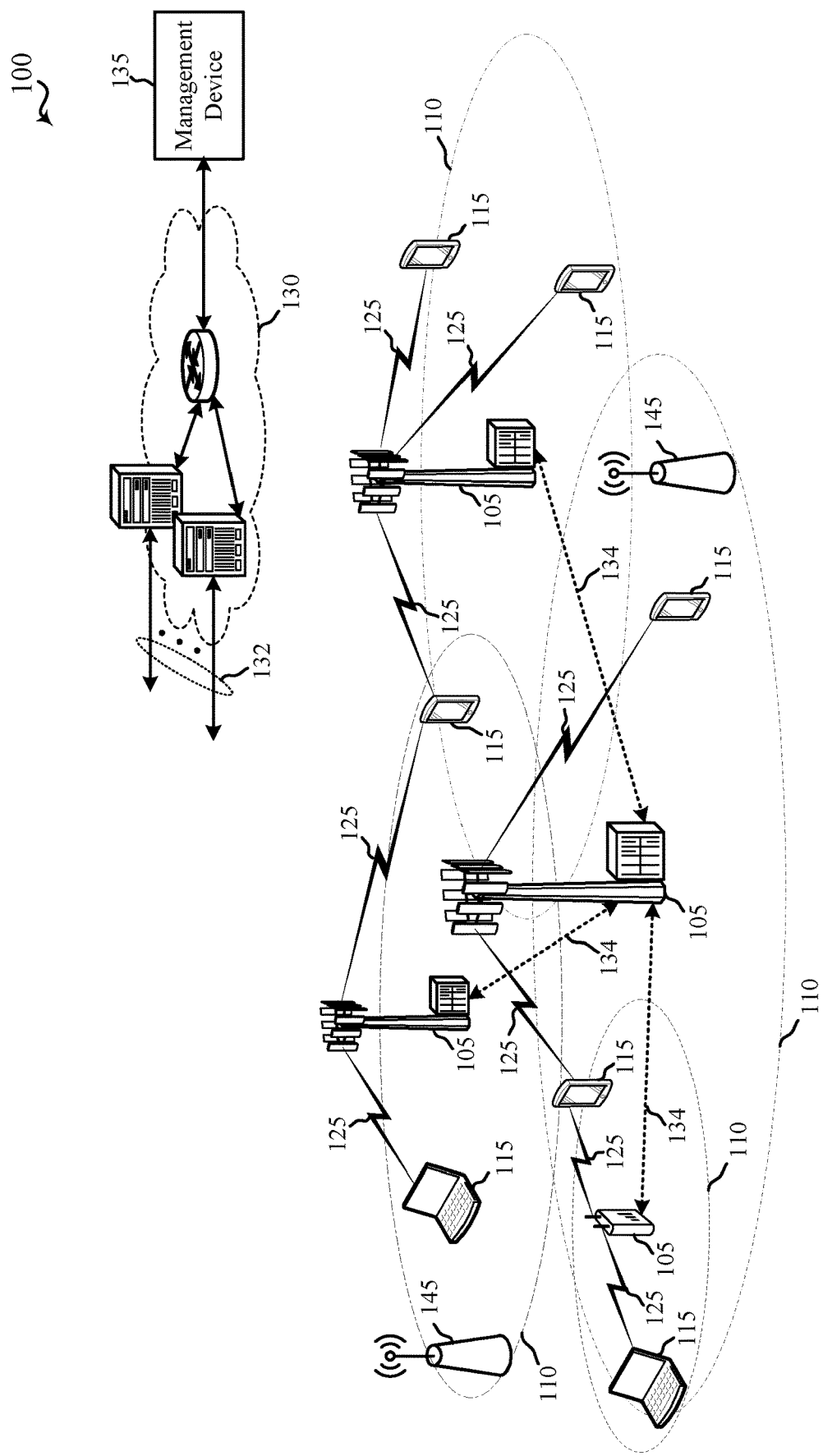
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include base stations 105 (i.e., a type of network access device), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a network access device, a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro cells or small cells). There may be overlapping geographic coverage areas 110 for different technologies and/or different types of network access devices.

In some examples, the wireless communication system 100 may include an LTE/LTE-A network. In LTE/LTE-A networks, the term evolved Node B (eNB) may be used to describe sets of one or more base stations 105. In some examples, the wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station 105, a carrier or component carrier associated with a base station, or a coverage area (e.g., sector, etc.) of a carrier or base station 105, depending on context.

A macro cell may cover a relatively large geographic area (e.g., several kilometers in radius) and may allow unrestricted access by UEs 115 with service subscriptions with the network provider. A small cell may be a lower-powered base station, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs 115 with service subscriptions with the network provider. A femto cell also may cover a relatively small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

In some examples of the wireless communication system 100, some or all of the base stations 105 may be replaced by one or more other type of network access device. For example, when the wireless communication system 100 includes a 5G or new radio network, one or more of the base stations 105 may be replaced by a set of radio heads (e.g., smart radio heads) in communication with an access node controller (ANCs), with the ANC communicating with other ANCs and/or the core network 130. In some examples, the wireless communication system 100 may include multiple types of networks or network access devices. For example, the wireless communication system 100 may include WLAN access points 145.

The wireless communication system 100 may support synchronous or asynchronous operation. For synchronous operation, the base stations 105 may have similar frame timing, and transmissions from different base stations 105 may be approximately aligned in time. For asynchronous operation, the base stations 105, other network access devices, or different networks within the wireless communication system 100 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations or other types of network access devices or network equipment, including macro eNBs, small cell eNBs, relay base stations, and the like.

The communication links 125 shown in wireless communication system 100 may include downlinks (DLs), from a base station 105 to a UE 115, and uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using multiple CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a dedicated radio frequency spectrum (e.g., a radio frequency spectrum licensed to particular users for particular uses) or a shared radio frequency spectrum (e.g., a radio frequency spectrum that is available for Wi-Fi use, a radio frequency spectrum that is available for use by different radio access technologies, or a radio frequency spectrum that is available for use by multiple MNOs in an equally shared or prioritized manner).

In some examples, a transmitting apparatus such as one of the base stations 105 or UEs 115 may use a gating interval to gain access to a wireless channel of a shared radio frequency spectrum (e.g., to a physical channel of the shared radio frequency spectrum). In some examples, the gating interval may be synchronous and periodic. For example, the periodic gating interval may be synchronized with at least one boundary of an LTE/LTE-A radio interval. In other examples, the gating interval may be asynchronous. The gating interval may define the application of a sharing protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure or an extended CCA (ECCA) procedure. The outcome of the CCA procedure or ECCA procedure may indicate to the transmitting apparatus whether a wireless channel of a shared radio frequency spectrum is available or not available for the gating interval (e.g., an LBT radio frame or transmission burst). When a CCA procedure or ECCA procedure indicates the wireless channel is available for a corresponding LBT radio frame or transmission burst (e.g., "clear" for use), the transmitting apparatus may reserve or use the wireless channel of the shared radio frequency spectrum during part or all of the LBT radio frame or other transmission interval. When a CCA procedure or ECCA procedure indicates the wireless channel is not available (e.g., that the wireless channel is in use or reserved by another transmitting apparatus), the transmitting apparatus may be prevented from using the wireless channel during the LBT radio frame or other transmission interval. In some examples, a transmitting apparatus may need to perform a CCA procedure or ECCA procedure for some but not other wireless channels in a shared radio frequency spectrum.

In some examples, some or all of the wireless devices (e.g., base stations 105, UEs, WLAN access points 145, etc.) may operate in a 3.5 GHz shared radio frequency spectrum as a Citizens Broadband Service Device (CBSD). A CBSD may be operated within a Citizens Broadband Radio Service (CBRS) framework, which may include locations or devices associated with different shared radio frequency spectrum access priorities or interference restrictions. To maintain or satisfy such access priorities or interference restrictions, a number of aggregated interference values may need to be determined (e.g., estimated). In some examples, the aggregated interference values may be determined by a management device 135. The management device 135 may be operated within or outside of the network(s) for which aggregated interference is being determined. In some examples, the management device 135 may take the form of a spectrum access system (SAS) or coexistence manager (CXM).

In some examples, the aggregated interference values determined by a management device 135 may include, for example, a general authorized access (GAA)-to-incumbent aggregated interference (e.g., an aggregated interference on an incumbent wireless device by GAA wireless devices), a GAA- to priority access licensee (PAL) aggregated interference (e.g., an aggregated interference on a PAL wireless device by GAA wireless devices), a PAL-to-incumbent aggregated interference (e.g., an aggregated interference on an incumbent wireless device by PAL wireless devices), a PAL-to-PAL aggregated interference (e.g., an aggregated interference on a PAL wireless device associated with a first PAL, by PAL wireless devices associated with a second PAL), or GAA-to-GAA aggregated interference (e.g., an aggregated interference on a GAA wireless device associated with a first GAA network or priority, by GAA wireless devices associated with a second GAA network or priority).

The GAA-to-GAA aggregated interference may in some examples be used for the purpose of GAA channel assignment algorithms (e.g., to decide whether an LTE/LTE-A LBT network creates interference for an LTE/LTE-A TDD network).

Figure 2:
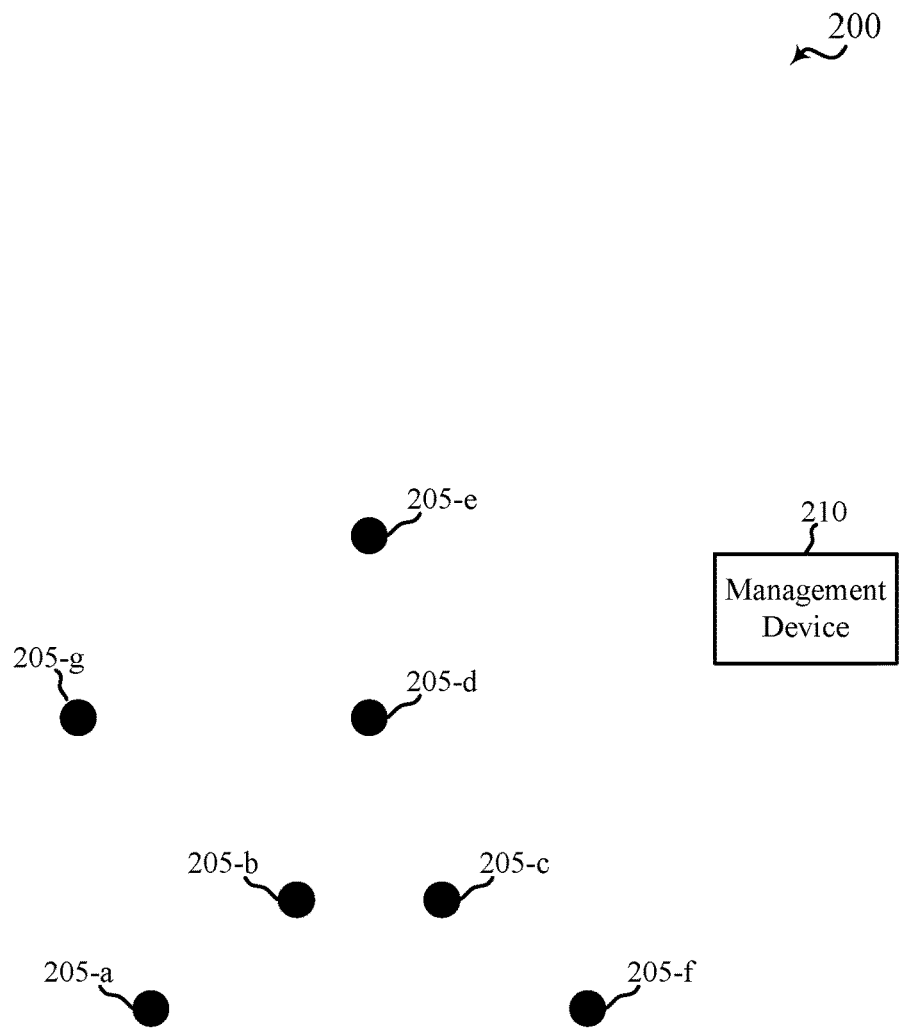
FIG. 2 shows a location graph for wireless devices in a wireless communication system, in accordance with various aspects of the present disclosure.

FIG. 2 shows a location graph 200 for wireless devices 205 in a wireless communication system, in accordance with various aspects of the present disclosure. By way of example, the wireless communication system is shown to include seven wireless devices 205 (e.g., LBT wireless devices or CBSDs), including a first wireless device 205-a, a second wireless device 205-b, a third wireless device 205-c, a fourth wireless device 205-d, a fifth wireless device 205-e, a sixth wireless device 205-f, and a seventh wireless device 205-g. The wireless devices 205 may be examples of aspects of the network access devices, base stations 105, small cells, or UEs 115 described with reference to FIG. 1. The wireless communication system also includes a management device 210. The management device 210 may be an example of aspects of the management device (e.g., a SAS or CXM) described with reference to FIG. 1.

Each of the wireless devices 205 may communicate over a shared radio frequency spectrum. However, before transmitting over the shared radio frequency spectrum, a wireless device 205 may perform an LBT procedure to determine whether the shared radio frequency spectrum is available. When a wireless device 205 determines that the shared radio frequency spectrum is available (e.g., that the energy on the shared radio frequency spectrum, or a channel thereof, is below a threshold energy level; or that no preamble is detected on the shared radio frequency spectrum or a channel thereof), the wireless device 205 may transmit over the shared radio frequency spectrum, blocking other wireless devices 205 that detect the energy (or a preamble) of its transmission. Upon determining that the shared radio frequency spectrum is not available, a wireless device 205 may not transmit over the shared radio frequency spectrum, and may perform another LBT procedure, at a later time, to determine whether the shared radio frequency spectrum is available at the later time.

By way of example, the seventh wireless device 205-g may have a higher priority access to the shared radio frequency spectrum than the other wireless devices 205. For example, the seventh wireless device 205-g may be an incumbent wireless device with respect to the other wireless devices 205 (e.g., a wireless device deployed earlier than the other wireless devices 205, or a wireless device deployed in an earlier-installed network or protected network (e.g., a government or emergency service network)). The seventh wireless device 205-g may also be a wireless device of a priority access licensee (PAL) having higher priority access to the shared radio frequency spectrum than PAL priority or a general authorized access (GAA) priority associated with other wireless devices 205. The seventh wireless device 205-g may also have a same priority access to the shared radio frequency spectrum than some or all of the other wireless devices 205, but may be associated with an aggregated interference threshold that has been exceeded by other wireless devices 205 within its energy detection range or preamble detection range. The seventh wireless device 205-g may also be a measurement device used to measure the aggregated interference value at a particular location, so that the aggregated interference value may be selectively adjusted.

The first wireless device 205-a, second wireless device 205-b, third wireless device 205-c, fourth wireless device 205-d, fifth wireless device 205-e, and sixth wireless device 205-f may be wireless devices of a same or different networks, and of a same or different network(s) as the seventh wireless device 205-g.

The management device 210 may be associated with the same network as the seventh wireless device 205-g, or the same network as one or more of the first wireless device 205-a, the second wireless device 205-b, the third wireless device 205-c, the fourth wireless device 205-d, the fifth wireless device 205-e, and the sixth wireless device 205-f. Alternatively, the management device 210 may be operated independently of the networks to which the wireless devices 205 belong.

In some examples, the management device 210 may be used to selectively adjust a wireless communication parameter of at least one of the wireless devices 205, to alter an aggregated interference value for the seventh wireless device 205-g (or for the location of the seventh wireless device 205-g). The management device 210 may also be used to selectively adjust a wireless communication parameter of one or more wireless devices to alter an aggregated interference value for another wireless device or location. The adjusted wireless communication parameter may include, for example, at least one of an ED threshold, a transmit power, a usable frequency range, or a combination thereof.

To appropriately adjust a wireless communication parameter of at least one of the wireless devices 205, to alter an aggregated interference value for the seventh wireless device 205-g, the management device 210 may first determine (e.g., estimate) the aggregated interference value for the seventh wireless device 205-g. In some examples, the management device 210 may determine an aggregated interference value for the seventh wireless device 205-g using a silencing-based method or an occupancy-based method.

In a silencing-based method, the management device 210 may identify an LBT silencing criterion between each pair of the first through sixth wireless devices 205 (i.e., those wireless devices that may transmit within an energy detection range of the seventh wireless device 205-g). LBT silencing is the potential for one wireless device's transmission (e.g., by virtue of the energy of the transmission, or a preamble contained within the transmission) to cause another wireless device 205 to determine, during its performance of an LBT procedure, that the shared radio frequency spectrum is unavailable. In some examples, the LBT silencing criterion may be a binary parameter indicating 1) a potential for LBT silencing between a pair of wireless devices, or 2) no potential for LBT silencing between the pair of wireless devices. In some examples, the LBT silencing criterion may be based on at least one of a transmit power of each wireless device 205 in a pair of wireless devices 205, an RF distance between the wireless devices 205 in the pair of wireless devices 205, at least one LBT parameter of each wireless device 205 in the pair of wireless devices 205, or a combination thereof. In some examples, the LBT parameter may include at least one of an ED threshold, a preamble detection capability, or a combination thereof.

Figure 3:
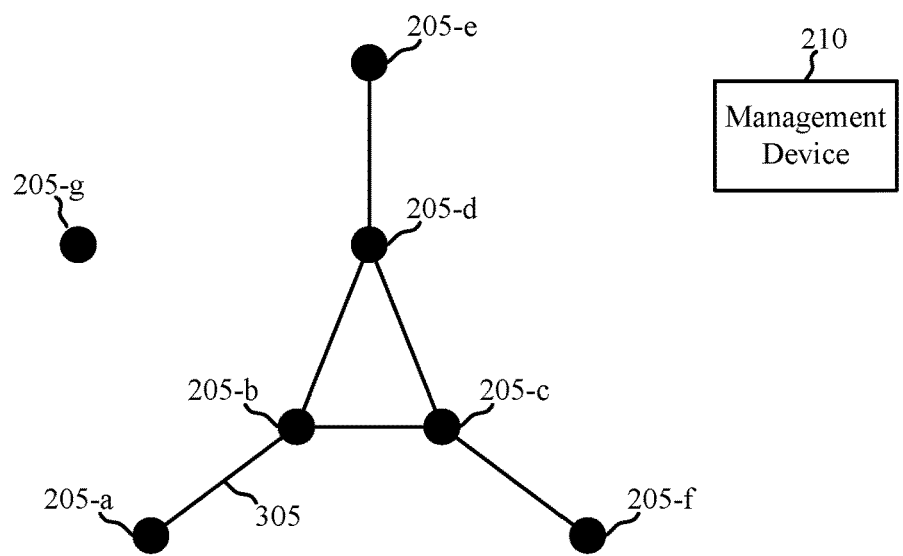
FIG. 3 shows a silencing graph for the first through sixth wireless devices shown in FIG. 2, in accordance with various aspects of the present disclosure.

FIG. 3 shows a silencing graph 300 for the first through sixth wireless devices 205 shown in FIG. 2, in accordance with various aspects of the present disclosure. Each vertex of the graph corresponds to a wireless device 205, and each edge between a pair of vertices indicates a potential for LBT silencing between the wireless devices represented by the vertices (e.g., the edge 305 between the vertices representing the first wireless device 205-a and the second wireless device 205-b (e.g., the edge 305 between vertices 1 and 2)

indicates a transmission of the first wireless device 205-*a* over the shared radio frequency spectrum may silence the second wireless device 205-*b* over the shared radio frequency spectrum, and vice versa.

By way of example, the silencing graph 300 is based on non-directional LBT silencing criterions, in which a transmission by either wireless device 205 in a pair of wireless devices 205 connected by an edge 305 may silence the other wireless device 205 of the pair. In an alternative example, the silencing graph 300 could be based on directional LBT silencing criterions, in which it is separately determined whether each wireless device 205 of a pair of wireless devices 205 may silence the other wireless device 205 of the pair. In the case of directional LBT silencing criterions, one wireless device 205 of a pair of wireless devices 205 may silence the other wireless device 205 of the pair, but the converse may or may not hold true. Directional LBT silencing criterions may be useful, for example, when the transmit powers or ED thresholds of the wireless devices 205 differ.

After identifying an LBT silencing criterion between each pair of wireless devices in a plurality of wireless devices, the management device 210 may divide the plurality of wireless devices into a plurality of independent sets based at least in part on the identified LBT silencing criterions. In some examples, the independent sets may be maximal independent sets. An independent set of wireless devices is a set of wireless devices that have no potential for silencing each other when any or all of the wireless devices in the set transmit—even simultaneously. A maximal independent set is an independent set that is not a subset of any other independent set. The set of all maximal independent sets may identified as $S=\{s_1, s_2, \ldots s_M\}$, where $s_i$ is a set of wireless devices 205 (or a set of vertices of the silencing graph 300). With reference to the silencing graph 300, there are four maximal independent sets, including $S=\{s_1, s_2, s_3, s_4\}=\{\{2,5,6\}, \{1,3,5\}, \{1,4,6\}, \{1,5,6\}\}$.

After dividing the plurality of wireless devices into a plurality of independent sets based at least in part on the identified LBT silencing criterions, the management device 210 may determine an aggregated interference value I, for a location, for each independent set (e.g., an aggregated interference value, $I_{s_1}$, $I_{s_2}$, $I_{s_3}$, or $I_{s_4}$, for each maximal independent set). The location for which the aggregated interference values are determined may be the location of the seventh wireless device 205-*g*. An aggregated interference value for an independent set, for a location, may be a value representing the maximum interference that the location would experience should all of the wireless devices of the independent set transmit simultaneously.

After determining an aggregated interference value for each independent set, the management device 210 may determine an aggregated interference value for the seventh wireless device 205-*g* (or the location of the seventh wireless device 205-*g*). The aggregated interference value for the seventh wireless device 205-*g* may be determined based at least in part on the determined aggregated interference values for each independent set, and may be (or have an upper bound of) $\max_{s \in S} I_s$ (or in the example shown in FIG. 3, $\max\{I_{s_1}, I_{s_2}, I_{s_3}, I_{s_4}\}$).

In some examples, the actual aggregated interference value may be less than $\max_{s \in S} I_s$. For example, for an energy detection-based LBT procedure, silencing of a wireless device may occur as a result of transmissions from more than one other wireless device transmitting at the same time, and not just a single other wireless device transmitting. Therefore, silencing of a wireless device may occur in more scenarios (or more often) than is indicated in FIG. 3. Also, the above-described silencing-based method assumes that each wireless device 205 always has packets to transmit, and does not take into account bursty traffic. Bursty traffic may result in a lower aggregated interference value.

Having determined an aggregated interference value for the seventh wireless device 205-*g* (or the location of the seventh wireless device 205-*g*), the management device 210 may adjust a wireless communication parameter of at least one of the wireless devices 205 to alter the aggregated interference value for the seventh wireless device 205-*g* (or for the location of the seventh wireless device 205-*g*). In some examples, the wireless communication parameter may be adjusted when the aggregated interference value for the seventh wireless device 205-*g* satisfies a threshold. Adjustment of the wireless communication parameter may help protect (or facilitate) the seventh wireless device's operation in the shared radio frequency spectrum. In some examples, the adjusted wireless communication parameter may include at least one of an ED threshold, a transmit power, a usable frequency range, or a combination thereof.

In some examples, the aggregated interference values for multiple wireless devices or locations may need to be altered, and at least one wireless communication parameter may be adjusted based on its impact to each of the aggregated interference values at each of the multiple wireless devices or locations.

In an occupancy-based method, the management device 210 may identify a shared radio frequency spectrum occupancy parameter for each of the first through sixth wireless devices 205 (i.e., those wireless devices that may transmit within an energy detection range of the seventh wireless device 205-*g* of FIG. 2). A shared radio frequency spectrum occupancy parameter may indicate the percentage of time, or duty cycle, at which a wireless device 205 transmits over the shared radio frequency spectrum. A plurality of N wireless devices may have shared radio frequency spectrum occupancy parameters of $\alpha_1, \alpha_2, \ldots, \alpha_N$, where $0 \leq \alpha_n \leq 1$, $n=1, 2, \ldots, N$. In some examples, the shared radio frequency spectrum occupancy parameters may be received from the plurality of wireless devices 205 (and in some examples, from the plurality of wireless devices 205 through other intermediary devices).

The management device 210 may also identify, for the seventh wireless device 205-*g* (or the location of the seventh wireless device 205-*g*), an actual interference value from each other wireless device 205 in the plurality of wireless devices 205. The actual interference value from a wireless device may be based on the wireless device being in a transmit mode (i.e., actively transmitting). In some examples, the actual interference values may be $i_1, i_2, \ldots, i_N$. In some examples, the actual interference values may be received from the seventh wireless device 205-*g*.

After identifying the shared radio frequency spectrum occupancy parameters and actual interference values, the management device 210 may determine an average aggregated interference value for the seventh wireless device 205-*g* (or for the location of the seventh wireless device 205-*g*) based at least in part on the identified shared radio frequency spectrum occupancy parameters and the identified actual interference values. In some examples, the average aggregated interference value for the seventh wireless device 205-*g* may be determined by multiplying, for each of the first through sixth wireless device 205, the identified shared radio frequency spectrum occupancy for the wireless device and the identified actual interference value from the wireless device to generate a product for the wireless device.

The generated products may be added to produce an average aggregated interference value, E[I], for the seventh wireless device 205-g, where:

$$E[I] = E[I_1 + I_2 + \ldots + I_N] = E[I_1] + E[I_2] \ldots + E[I_N]$$
$$= \alpha_1 i_1 + \alpha_2 i_2 + \ldots \alpha_N i_N,$$

I is a random variable representing the aggregated interference value for the seventh wireless device 205-g from all other wireless devices 205, $I_n$ is a random variable representing the interference value for the seventh wireless device 205-g from the wireless device n, and $i_n$ is a deterministic value (not a random value) representing the interference value for the seventh wireless device 205-g from the wireless device n. The randomness of I and $I_n$ may be a result of traffic patterns and LBT mechanisms resulting in different sets of wireless devices 205 transmitting at different times.

Having determined an average aggregated interference value for the seventh wireless device 205-g (or the location of the seventh wireless device 205-g), the management device 210 may determine to adjust a wireless communication parameter of at least one of the wireless devices 205, to alter the aggregated interference value for the seventh wireless device 205-g (or for the location of the seventh wireless device 205-g). In some examples, the wireless communication parameter may be adjusted when the aggregated interference value for the seventh wireless device 205-g satisfies a threshold. Adjustment of the wireless communication parameter may help protect (or facilitate) the seventh wireless device's operation in the shared radio frequency spectrum. In some examples, the adjusted wireless communication parameter may include at least one of an ED threshold, a transmit power, a usable frequency range, or a combination thereof.

In some examples, the aggregated interference values for multiple wireless devices or locations may need to be altered, and at least one wireless communication parameter may be adjusted based on its impact to each of the aggregated interference values at each of the multiple wireless devices or locations.

An occupancy-based method may in some cases be advantageous for selectively adjusting a wireless communication parameter of at least one of the wireless devices, to alter an aggregated interference value for another wireless device (or for a location of the other wireless device) because an occupancy-based method takes accounts bursty traffic and loading variations. However, an occupancy-based method may not guarantee an upper bound on an aggregated interference value, and may not easily serve as a basis for calculating other statistical interference values (e.g., median aggregated interference, maximum aggregated interference, etc.) because the joint probability distribution is unknown (e.g., the correlation between $I_1, I_2, \ldots I_N$ can be complicated and depends on traffic patterns).

Figure 4:
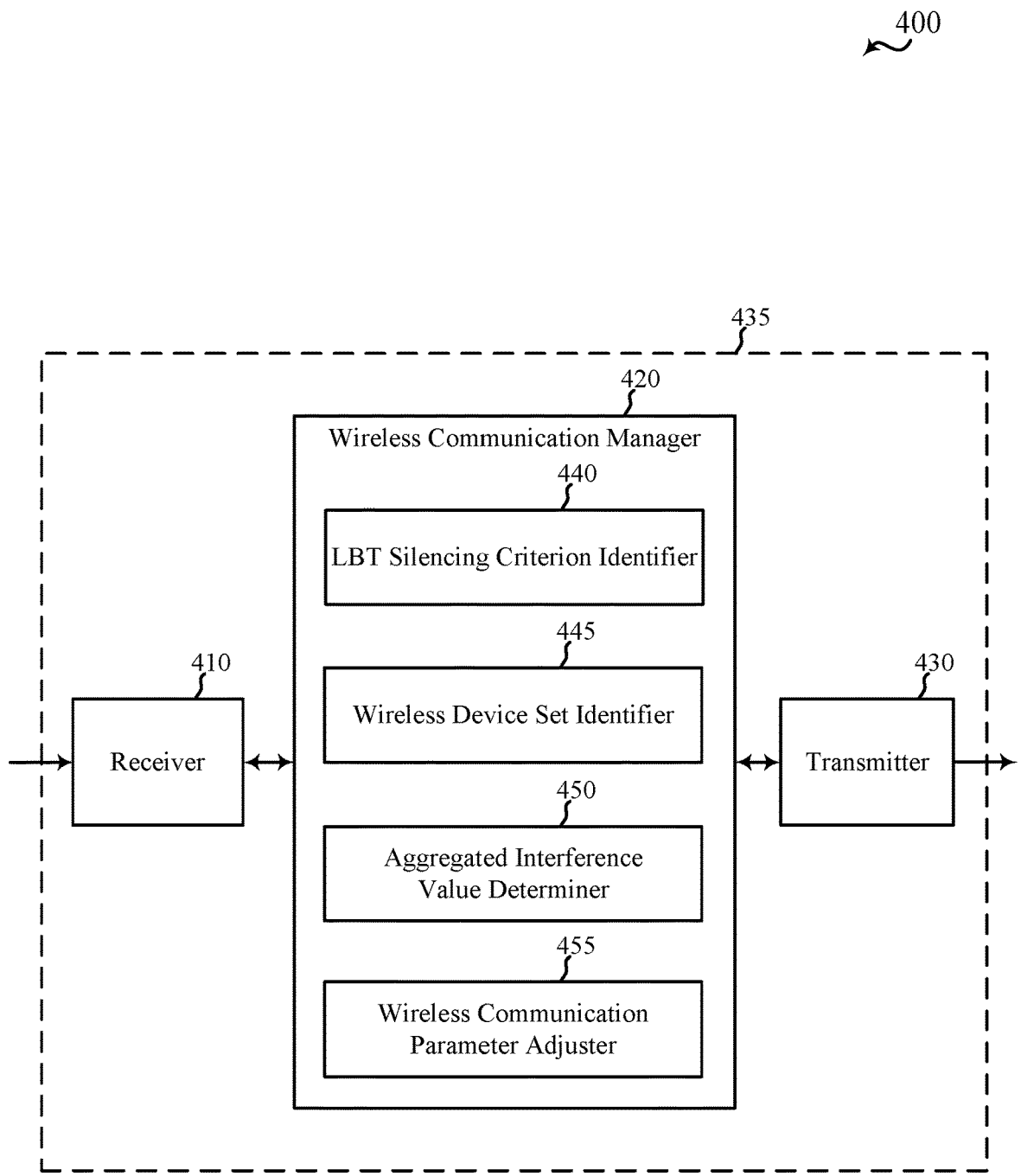
FIG. 4 shows a block diagram of an apparatus for use in wireless communication, in accordance with various aspects of the present disclosure.

FIG. 4 shows a block diagram 400 of an apparatus 435 for use in wireless communication, in accordance with various aspects of the present disclosure. The apparatus 435 may be an example of aspects of one or more of the management devices described with reference to FIG. 1, 2, or 3. The apparatus 435 may also be or include a processor. The apparatus 435 may include a receiver 410, a wireless communication manager 420, or a transmitter 430. Each of these components may be in communication with each other.

The components of the apparatus 435 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 410 may include at least one wired or wireless (e.g., radio frequency (RF)) receiver. The receiver 410 may be used to receive various types of data or control signals (i.e., "data" or transmissions) over one or more communication links of a wired or wireless communication system, such as one or more communication links of the wireless communication system 100 or 200 described with reference to FIG. 1, 2, or 3. The communication links may include wired or wireless links.

In some examples, the transmitter 430 may include at least one wired or wireless (e.g., RF) transmitter. The transmitter 430 may be used to transmit various types of data or control signals (i.e., "data" or transmissions) over one or more communication links of a wired or wireless communication system, such as one or more communication links of the wireless communication system 100 or 200 described with reference to FIG. 1, 2, or 3. The communication links may include wired or wireless links.

In some examples, the wireless communication manager 420 may be used to manage one or more aspects of wireless communication for the apparatus 435. In some examples, part of the wireless communication manager 420 may be incorporated into or shared with the receiver 410 or the transmitter 430. In some examples, the wireless communication manager 420 may include an LBT silencing criterion identifier 440, a wireless device set identifier 445, an aggregated interference value determiner 450, or a wireless communication parameter adjuster 455.

The LBT silencing criterion identifier 440 may be used to identify an LBT silencing criterion between each pair of wireless devices in a plurality of wireless devices (e.g., CBSDs), as described, for example, with reference to FIG. 3. In some examples, the LBT silencing criterion may be a binary parameter indicating a potential for LBT silencing between a pair of wireless devices or no potential for LBT silencing between the pair of wireless devices. In some examples, the LBT silencing criterion may be based on at least one of a transmit power of each wireless device in a pair of wireless devices, an RF distance between the wireless devices in the pair of wireless devices, at least one LBT parameter of each wireless device in the pair of wireless devices, or a combination thereof. In some examples, the identified LBT silencing criterions may include at least one of: non-directional LBT silencing criterions, directional LBT silencing criterions, or a combination thereof. The LBT silencing criterion may be in reference to a predetermined shared radio frequency spectrum.

The wireless device set identifier 445 may be used to divide the plurality of wireless devices into a plurality of independent sets based at least in part on the identified LBT silencing criterions, as described, for example, with reference to FIG. 3. Each independent set may include a subset of wireless devices that are capable of gaining access to the shared radio frequency spectrum and transmitting simultaneously.

The aggregated interference value determiner 450 may be used to determine, for a location, an aggregated interference value for each independent set, as described, for example, with reference to FIG. 3. In some examples, the location may be a location of a wireless device having higher priority access to the shared radio frequency spectrum than one or more (or all) of the plurality of wireless devices. The aggregated interference value determiner 450 may also be used to determine an aggregated interference value for the location based at least in part on the determined aggregated interference values for each independent set.

The wireless communication parameter adjuster 455 may be used to selectively adjust a wireless communication parameter of at least one of the wireless devices, to alter the aggregated interference value for the location. In some examples, the wireless communication parameter of the at least one of the wireless devices may include at least one of an ED threshold, a transmit power, a usable frequency range, or a combination thereof.

Figure 5:
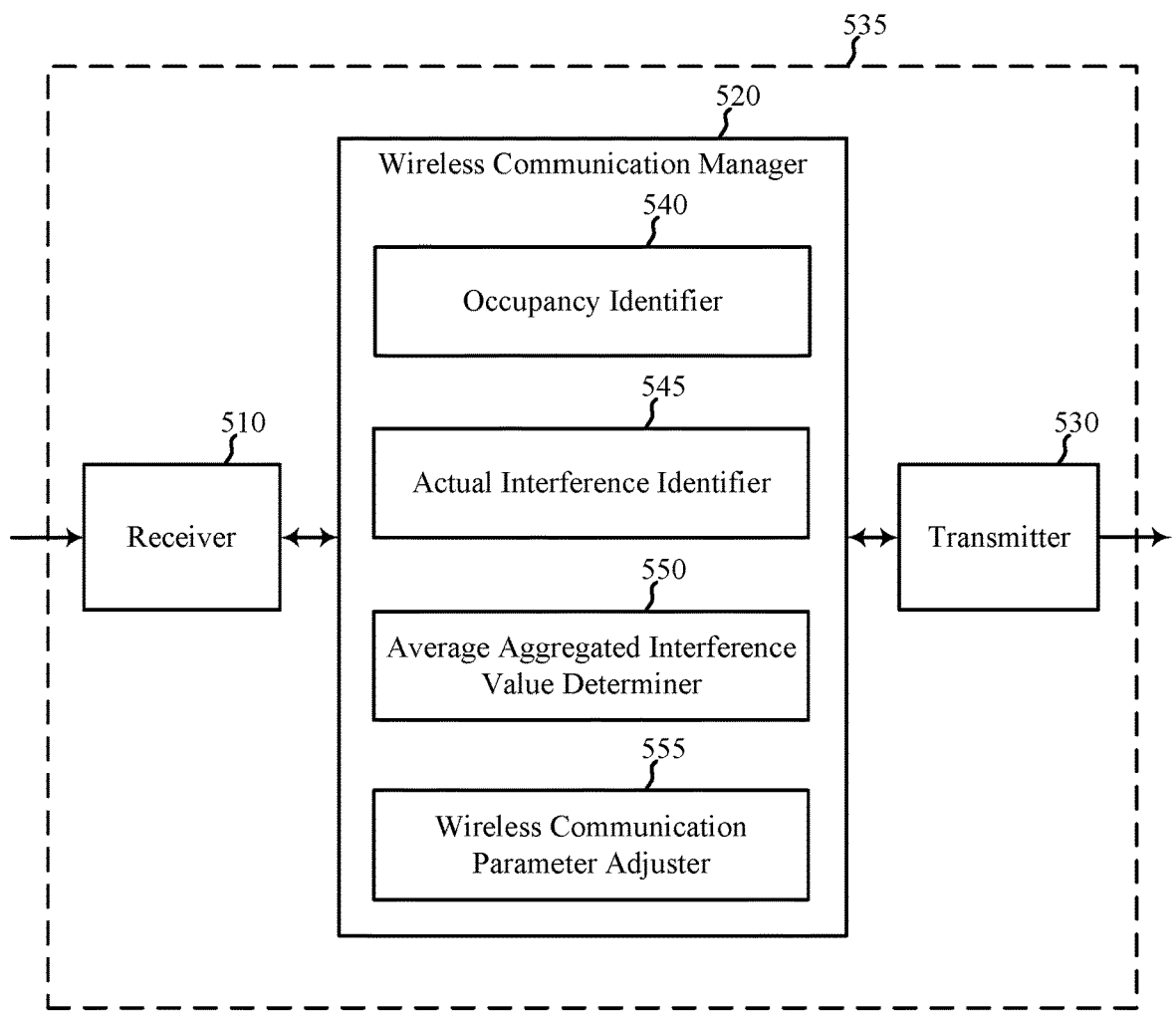
FIG. 5 shows a block diagram of an apparatus for use in wireless communication, in accordance with various aspects of the present disclosure.

FIG. 5 shows a block diagram 500 of an apparatus 535 for use in wireless communication, in accordance with various aspects of the present disclosure. The apparatus 535 may be an example of aspects of one or more of the management devices described with reference to FIG. 1, 2, or 3. The apparatus 535 may also be or include a processor. The apparatus 535 may include a receiver 510, a wireless communication manager 520, or a transmitter 530. Each of these components may be in communication with each other.

The components of the apparatus 535 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 510 may include at least one wired or wireless (e.g., RF) receiver. The receiver 510 may be used to receive various types of data or control signals (i.e., "data" or transmissions) over one or more communication links of a wired or wireless communication system, such as one or more communication links of the wireless communication system 100 or 200 described with reference to FIG. 1, 2, or 3. The communication links may include wired or wireless links.

In some examples, the transmitter 530 may include at least one wired or wireless (e.g., RF) transmitter. The transmitter 530 may be used to transmit various types of data or control signals (i.e., "data" or transmissions) over one or more communication links of a wired or wireless communication system, such as one or more communication links of the wireless communication system 100 or 200 described with reference to FIG. 1, 2, or 3. The communication links may include wired or wireless links.

In some examples, the wireless communication manager 520 may be used to manage one or more aspects of wireless communication for the apparatus 535. In some examples, part of the wireless communication manager 520 may be incorporated into or shared with the receiver 510 or the transmitter 530. In some examples, the wireless communication manager 520 may include an occupancy identifier 540, an actual interference identifier 545, an average aggregated interference value determiner 550, or a wireless communication parameter adjuster 555.

The occupancy identifier 540 may be used to identify a shared radio frequency spectrum occupancy parameter for each wireless device in a plurality of wireless devices (e.g., CBSDs). In some examples, the shared radio frequency spectrum occupancy parameters may be received from the plurality of wireless devices (and in some examples, from the plurality of wireless devices through other intermediary devices).

The actual interference identifier 545 may be used to identify, for a location, an actual interference value from each wireless device in the plurality of wireless devices. The actual interference value from a wireless device may be based on the wireless device being in a transmit mode (i.e., actively transmitting). In some examples, the location may be a location of a wireless device having higher priority access to the shared radio frequency spectrum than one or more (or all) of the plurality of wireless devices. In some examples, the actual interference values may be received from the wireless device located at the location.

The average aggregated interference value determiner 550 may be used to determine an average aggregated interference value for the location based at least in part on the identified shared radio frequency spectrum occupancy parameters and the identified actual interference values. In some examples, determining the average aggregated interference value for the location may include multiplying, for each wireless device in the plurality of wireless devices, the identified shared radio frequency spectrum occupancy for a wireless device and the identified actual interference value from the wireless device to generate a product for the wireless device, and adding the generated products for the plurality of wireless devices.

The wireless communication parameter adjuster 555 may be used to selectively adjust a wireless communication parameter of at least one of the wireless devices, to alter the aggregated interference value for the location. In some examples, the wireless communication parameter of the at least one of the wireless devices may include at least one of an ED threshold, a transmit power, a usable frequency range, or a combination thereof.

Figure 6:
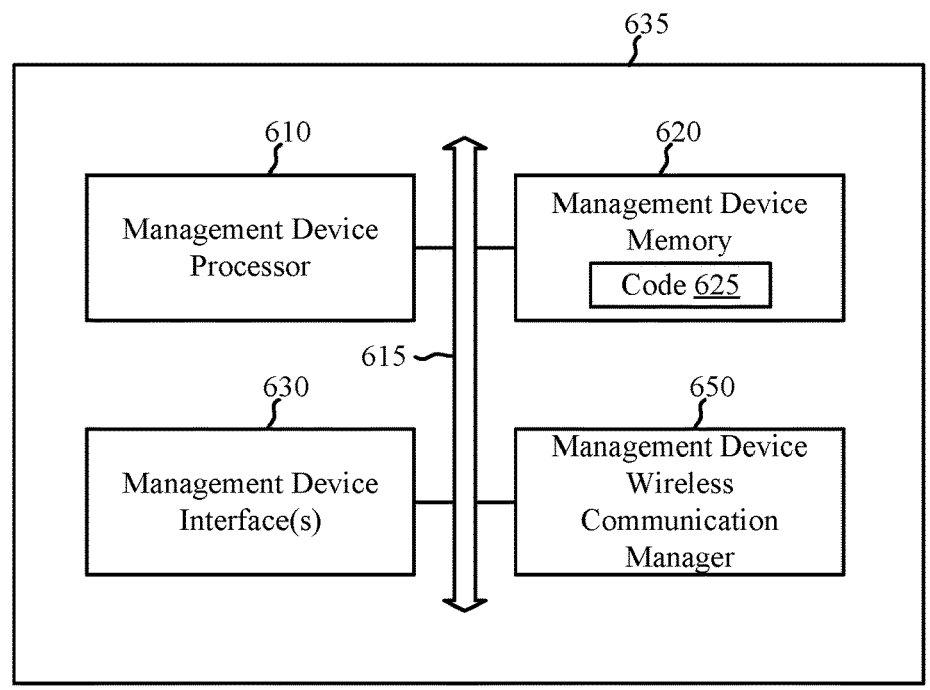
FIG. 6 shows a block diagram of a management device for use in wireless communication, in accordance with various aspects of the present disclosure.

FIG. 6 shows a block diagram 600 of a management device 635 for use in wireless communication, in accordance with various aspects of the present disclosure. The management device 635 may be included or be part of a SAS, CXM, etc. In some examples, the management device 635 may be an example of aspects of one or more of the management devices described with reference to FIG. 1, 2, or 3, or aspects of the apparatus described with reference to FIG. 4 or 5. The management device 635 may be configured to implement at least some of the management device or apparatus techniques or functions described with reference to FIG. 1, 2, 3, 4, or 5.

The management device 635 may include a management device processor 610, a management device memory 620, at least one management device interface (represented by management device interface(s) 630), or a management device wireless communication manager 650. Each of these components may be in communication with each other, directly or indirectly, over one or more buses 615.

The management device memory 620 may include random access memory (RAM) or read-only memory (ROM). The management device memory 620 may store computer-readable, computer-executable code 625 containing instructions that are configured to, when executed, cause the management device processor 610 to perform various functions described herein related to wireless communication, including, for example, selectively adjusting a wireless communication parameter of at least one wireless device to alter the average aggregated interference value for a location, etc. Alternatively, the computer-executable code 625 may not be directly executable by the management device processor 610 but be configured to cause the management device 635 (e.g., when compiled and executed) to perform various of the functions described herein.

The management device processor 610 may include an intelligent hardware device, e.g., a central processing unit (CPU), a microcontroller, an ASIC, etc. The management device processor 610 may process information received via one or more of the management device interface(s) 630 or information to be transmitted via one or more of the management device interface(s) 630. The management device processor 610 may handle, alone or in connection with the management device wireless communication manager 650, various aspects of managing communications over (or communicating over) a shared radio frequency spectrum.

The management device interface(s) 630 may include one or more wired or wireless (e.g., RF) interfaces for communicating bi-directionally with, for example, CBSDs or other devices. In some examples, the communications may be packet-based, and in some examples, the management device interface(s) 630 may include a modem to modulate and demodulate packets. The management device interface(s) 630 may, in some examples, be implemented as one or more management device receivers and one or more separate management device transmitters.

The management device wireless communication manager 650 may be configured to perform or control some or all of the management device or apparatus techniques or functions described with reference to FIG. 1, 2, 3, 4, or 5 related to wireless communication over a shared radio frequency spectrum. The management device wireless communication manager 650, or portions of it, may include a processor, or some or all of the functions of the management device wireless communication manager 650 may be performed by the management device processor 610 or in connection with the management device processor 610. In some examples, the management device wireless communication manager 650 may be an example of the wireless communication manager described with reference to FIG. 4 or 5.

Figure 7:
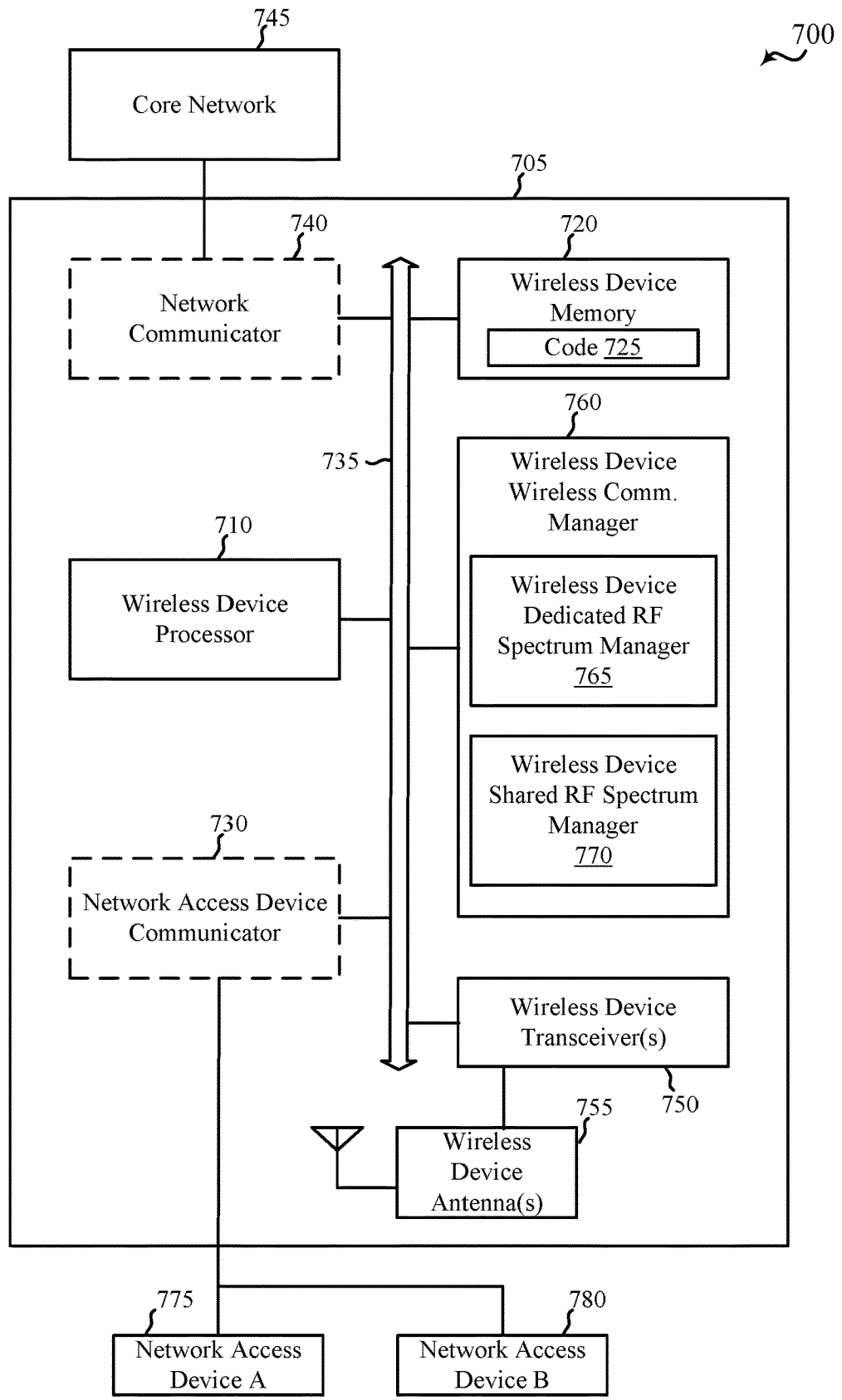
FIG. 7 shows a block diagram of a wireless device (e.g., an LBT wireless device or CBSD) for use in wireless communication, in accordance with various aspects of the present disclosure.

FIG. 7 shows a block diagram 700 of a wireless device 705 (e.g., an LBT wireless device or CBSD) for use in wireless communication, in accordance with various aspects of the present disclosure. In some examples, the wireless device 705 may be an example of one or more aspects of a wireless device (e.g., a network access device, base station, small cell, UE 115, etc.) described with reference to FIG. 1, 2, or 3. The wireless device 705 may be configured to implement or facilitate at least some of the wireless device, CBSD, network access device, base station, small cell, or UE techniques or functions described with reference to FIG. 1, 2, or 3.

The wireless device 705 may include a wireless device processor 710, a wireless device memory 720, at least one wireless device transceiver (represented by wireless device transceiver(s) 750), at least one wireless device antenna (represented by wireless device antenna(s) 755), or a wireless device wireless communication manager 760. When the wireless device 705 is a network access device, the wireless device 705 may also include one or more of a network access device communicator 730 or a network communicator 740. Each of these components may be in communication with each other, directly or indirectly, over one or more buses 735.

The wireless device memory 720 may include RAM or ROM. The wireless device memory 720 may store computer-readable, computer-executable code 725 containing instructions that are configured to, when executed, cause the wireless device processor 710 to perform various functions described herein related to wireless communication, including, for example, acquiring, generating, and/or transmitting indications of a transmit power, a location, at least one LBT parameter, a shared radio frequency spectrum occupancy parameter, etc. Alternatively, the computer-executable code 725 may not be directly executable by the wireless device processor 710 but be configured to cause the wireless device 705 (e.g., when compiled and executed) to perform various of the functions described herein.

The wireless device processor 710 may include an intelligent hardware device, e.g., a CPU, a microcontroller, an ASIC, etc. The wireless device processor 710 may process information received through the wireless device transceiver(s) 750, the optional network access device communicator 730, or the optional network communicator 740. The wireless device processor 710 may also process information to be sent to the transceiver(s) 750 for transmission through the antenna(s) 755, to the network access device communicator 730 for transmission to one or more network access devices (e.g., to network access device 775 and/or network access device 780), or to the network communicator 740 for transmission to a core network 745 (which may be an example of one or more aspects of the core network 130 described with reference to FIG. 1). The wireless device processor 710 may handle, alone or in connection with the wireless device wireless communication manager 760, various aspects of communicating over (or managing communications over) a dedicated radio frequency spectrum or a shared radio frequency spectrum.

The wireless device transceiver(s) 750 may include a modem configured to modulate packets and provide the modulated packets to the wireless device antenna(s) 755 for transmission, and to demodulate packets received from the wireless device antenna(s) 755. The wireless device transceiver(s) 750 may, in some examples, be implemented as one or more wireless device receivers and one or more separate wireless device transmitters. The wireless device transceiver(s) 750 may support communications in the dedicated radio frequency spectrum or the shared radio frequency spectrum. The wireless device transceiver(s) 750 may be configured to communicate bi-directionally, via the wireless device antenna(s) 755, with one or more other wireless devices (e.g., network access devices, base stations, small cells, UEs 115, or management devices), such as one or more of the wireless devices described with reference to FIG. 1, 2, or 3, or one or more of the apparatuses described with reference to FIG. 4 or 5. The wireless device 705 may, for example, include multiple wireless device antennas 755 (e.g., an antenna array). The wireless device 705 may communicate with the core network 745 (which in some examples may include, or provide access to, a management device) through the network communicator 740. In some examples, the wireless device 705 may also communicate with network access devices, such as the network access device 775 and/or the network access device 780, using the network access device communicator 730.

The wireless device wireless communication manager 760 may be configured to perform or control some or all of the techniques or functions described with reference to FIG. 1, 2, or 3 related to wireless communication over the dedicated radio frequency spectrum or the shared radio frequency spectrum. For example, the wireless device wireless communication manager 760 may be configured to support a supplemental downlink mode (e.g., a LAA mode), a carrier aggregation mode (e.g., an eLAA mode), or a standalone mode (e.g., a MuLTEfire mode) using the dedicated radio frequency spectrum or the shared radio frequency spectrum. The wireless device wireless communication manager 760 may include a wireless device dedicated RF spectrum manager 765 configured to handle communications in the dedicated radio frequency spectrum, and a wireless device shared RF spectrum manager 770 configured to handle communications in the shared radio frequency spectrum. The wireless device wireless communication manager 760, or portions of it, may include a processor, or some or all of the functions of the wireless device wireless communication manager 760 may be performed by the wireless device processor 710 or in connection with the wireless device processor 710.

Figure 8:
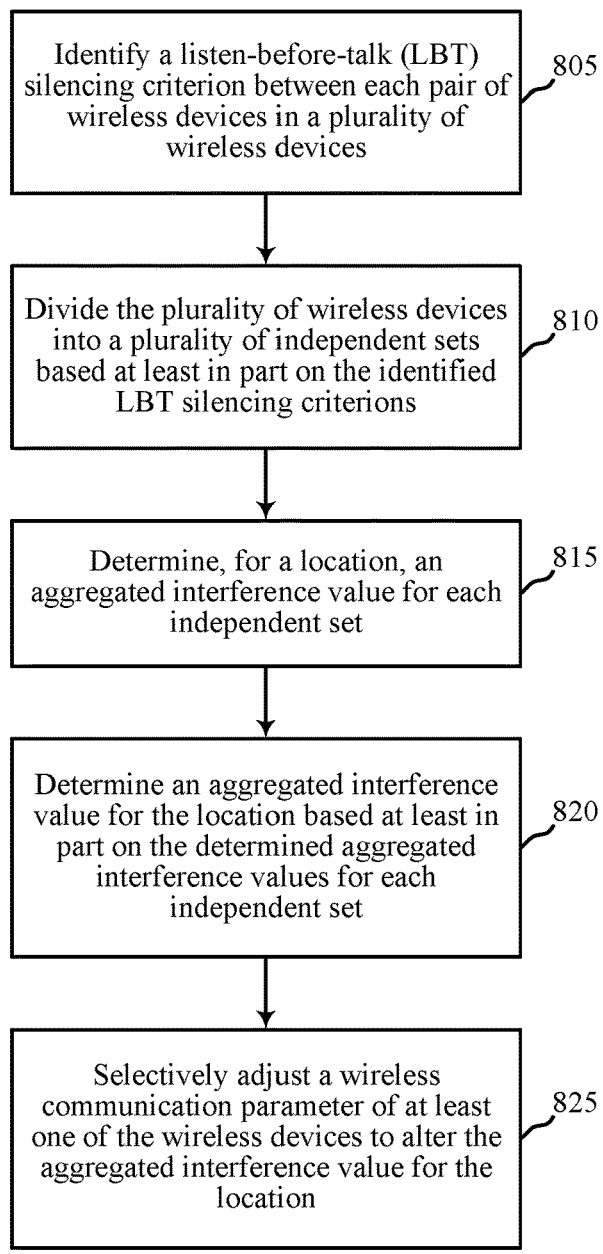
FIG. 8 is a flow chart illustrating an example of a method for wireless communication, in accordance with various aspects of the present disclosure.

FIG. 8 is a flow chart illustrating an example of a method 800 for wireless communication, in accordance with various aspects of the present disclosure. For clarity, the method 800 is described below with reference to aspects of one or more of the management devices described with reference to FIG. 1, 2, 3, or 6, or aspects of the apparatus described with reference to FIG. 4. In some examples, a management device may execute one or more sets of codes to control the functional elements of the management device to perform the functions described below. Additionally or alternatively, the management device may perform one or more of the functions described below using special-purpose hardware.

At block 805, the method 800 may include identifying an LBT silencing criterion between each pair of wireless devices in a plurality of wireless devices (e.g., LBT wireless devices or CBSDs), as described, for example, with reference to FIG. 3. In some examples, the LBT silencing criterion may be a binary parameter indicating a potential for LBT silencing between a pair of wireless devices or no potential for LBT silencing between the pair of wireless devices. In some examples, the LBT silencing criterion may be based on at least one of a transmit power of each wireless device in a pair of wireless devices, an RF distance between the wireless devices in the pair of wireless devices, at least one LBT parameter of each wireless device in the pair of wireless devices, or a combination thereof. In some examples, the identified LBT silencing criterions may include at least one of non-directional LBT silencing criterions, directional LBT silencing criterions, or a combination thereof. The LBT silencing criterion may be in reference to a predetermined shared radio frequency spectrum. The operation(s) at block 805 may be performed using the wireless communication manager 420 or 650 described with reference to FIG. 4 or 6, or the LBT silencing criterion identifier 440 described with reference to FIG. 4.

At block 810, the method 800 may include dividing the plurality of wireless devices into a plurality of independent sets based at least in part on the identified LBT silencing criterions, as described, for example, with reference to FIG. 3. Each independent set may include a subset of wireless devices that are capable of gaining access to the shared radio frequency spectrum and transmitting simultaneously. The operation(s) at block 810 may be performed using the wireless communication manager 420 or 650 described with reference to FIG. 4 or 6, or the wireless device set identifier 445 described with reference to FIG. 4.

At block 815, the method 800 may include determining, for a location, an aggregated interference value for each independent set, as described, for example, with reference to FIG. 3. In some examples, the location may be a location of a wireless device having higher priority access to the shared radio frequency spectrum than one or more (or all) of the plurality of wireless devices. The operation(s) at block 815 may be performed using the wireless communication manager 420 or 650 described with reference to FIG. 4 or 6, or the aggregated interference value determiner 450 described with reference to FIG. 4.

At block 820, the method 800 may include determining an aggregated interference value for the location based at least in part on the determined aggregated interference values for each independent set. The operation(s) at block 820 may be performed using the wireless communication manager 420 or 650 described with reference to FIG. 4 or 6, or the aggregated interference value determiner 450 described with reference to FIG. 4.

At block 825, the method 800 may include selectively adjusting a wireless communication parameter of at least one of the wireless devices, to alter the aggregated interference value for the location. In some examples, the wireless communication parameter of the at least one of the wireless devices may include at least one of an ED threshold, a transmit power, a usable frequency range, or a combination thereof. The operation(s) at block 825 may be performed using the wireless communication manager 420 or 650 described with reference to FIG. 4 or 6, or the wireless communication parameter adjuster 455 described with reference to FIG. 4.

Figure 9:
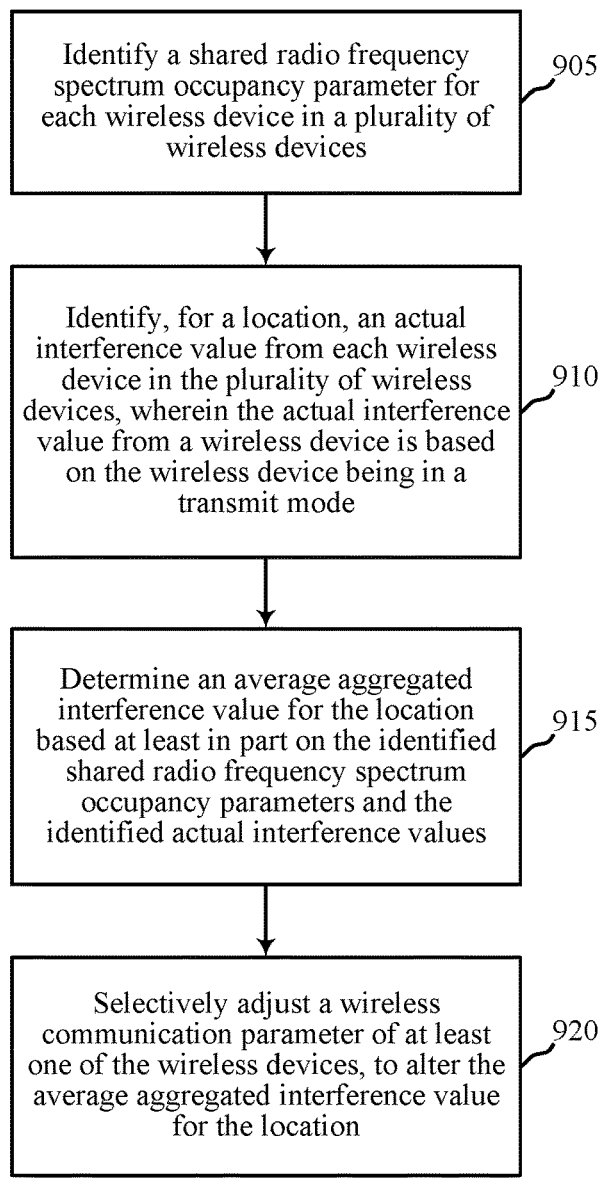
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the management devices described with reference to FIG. 1, 2, 3, or 6, or aspects of the apparatus described with reference to FIG. 4. In some examples, a management device may execute one or more sets of codes to control the functional elements of the management device to perform the functions described below. Additionally or alternatively, the management device may perform one or more of the functions described below using special-purpose hardware.

At block 905, the method 900 may include identifying a shared radio frequency spectrum occupancy parameter for each wireless device in a plurality of wireless devices (e.g., LBT wireless devices or CBSDs). The operation(s) at block 905 may be performed using the wireless communication manager 420 or 650 described with reference to FIG. 4 or 6, or the occupancy identifier 540 described with reference to FIG. 5.

At block 910, the method 900 may include identifying, for a location, an actual interference value from each wireless device in the plurality of wireless devices. The actual interference value from a wireless device may be based on the wireless device being in a transmit mode (i.e., actively transmitting). In some examples, the location may be a location of a wireless device having higher priority access to the shared radio frequency spectrum than one or more (or all) of the plurality of wireless devices. The operation(s) at block 910 may be performed using the wireless communication manager 420 or 650 described with reference to FIG. 4 or 6, or the actual interference identifier 545 described with reference to FIG. 5.

In some examples, the method 900 may include receiving the shared radio frequency spectrum occupancy parameters from the plurality of wireless devices (and in some examples, from the plurality of wireless devices through other intermediary devices). In some examples, the method 900 may include receiving the actual interference values from a wireless device located at the location.

At block 915, the method 900 may include determining an average aggregated interference value for the location based at least in part on the identified shared radio frequency spectrum occupancy parameters and the identified actual interference values. In some examples, determining the average aggregated interference value for the location may include multiplying, for each wireless device in the plurality of wireless devices, the identified shared radio frequency spectrum occupancy for a wireless device and the identified actual interference value from the wireless device to generate a product for the wireless device, and adding the generated products for the plurality of wireless devices. The operation(s) at block 915 may be performed using the wireless communication manager 420 or 650 described with reference to FIG. 4 or 6, or the average aggregated interference value determiner 550 described with reference to FIG. 5.

At block 920, the method 900 may include selectively adjusting a wireless communication parameter of at least one of the wireless devices to alter the average aggregated interference value for the location. In some examples, the wireless communication parameter of the at least one of the wireless devices may include at least one of an ED threshold, a transmit power, a usable frequency range, or a combination thereof. The operation(s) at block 920 may be performed using the wireless communication manager 420 or 650 described with reference to FIG. 4 or 6, or the wireless communication parameter adjuster 555 described with reference to FIG. 5.

The methods 800 and 900 described with reference to FIGS. 8 and 9 are examples of implementations of techniques described in the present disclosure, and the operations of the methods 800 and 900 may be rearranged, combined with other operations of the same or different methods, or otherwise modified, such that other implementations are possible. Operations may also be added to the methods 800 and 900.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication, comprising:
   identifying a listen-before-talk (LBT) silencing criterion between each pair of a plurality of pairs of wireless devices in a plurality of wireless devices, wherein the LBT silencing criterion for a pair of wireless devices in the plurality of wireless devices indicates whether LBT silencing occurs between that pair of wireless devices;
   dividing the plurality of wireless devices into a plurality of independent sets based at least in part on the identified LBT silencing criteria;
   determining, for a wireless device outside the plurality of wireless devices, an aggregated interference value for each independent set;
   determining an aggregated interference value for the wireless device outside the plurality of wireless devices based at least in part on the determined aggregated interference values for each independent set; and
   selectively adjusting a wireless communication parameter of at least one of the wireless devices of the plurality of wireless devices to alter the aggregated interference value for the wireless device outside the plurality of wireless devices.

2. The method of claim 1, wherein the LBT silencing criterion is a binary parameter.

3. The method of claim 1, wherein the LBT silencing criterion for the pair of wireless devices in the plurality of wireless devices is based on at least one of: a transmit power of each wireless device in the pair of wireless devices, a radio frequency (RF) distance between the wireless devices in the pair of wireless devices, at least one LBT parameter of each wireless device in the pair of wireless devices, or a combination thereof.

4. The method of claim 3, wherein the at least one LBT parameter comprises at least one of: an energy detection (ED) threshold, a preamble detection capability, or a combination thereof.

5. The method of claim 1, wherein the identified LBT silencing criteria comprise at least one of: non-directional LBT silencing criteria, directional LBT silencing criteria, or a combination thereof.

6. The method of claim 1, wherein the wireless communication parameter of the at least one of the wireless devices comprises at least one of: an energy detection (ED) threshold, a transmit power, a usable frequency range, or a combination thereof.

7. An apparatus for wireless communication, comprising:
   a processor;
   memory in electronic communication with the processor; and
   instructions stored in the memory, the instructions being executable by the processor to cause the apparatus to:
   identify a listen-before-talk (LBT) silencing criterion between each pair of a plurality of pairs of wireless devices in a plurality of wireless devices, wherein the LBT silencing criterion for a pair of wireless devices in the plurality of wireless devices indicates whether LBT silencing occurs between that pair of wireless devices;
   divide the plurality of wireless devices into a plurality of independent sets based at least in part on the identified LBT silencing criteria;
   determine, for a wireless device outside the plurality of wireless devices, an aggregated interference value for each independent set;
   determine an aggregated interference value for the wireless device outside the plurality of wireless devices based at least in part on the determined aggregated interference values for each independent set; and
   selectively adjust a wireless communication parameter of at least one of the wireless devices of the plurality of wireless devices to alter the aggregated interference value for the wireless device outside the plurality of wireless devices.

8. The apparatus of claim 7, wherein the LBT silencing criterion is a binary parameter.

9. The apparatus of claim 7, wherein the LBT silencing criterion for each pair of wireless devices in the plurality of wireless devices is based on at least one of: a transmit power of each wireless device in the pair of wireless devices, a radio frequency (RF) distance between the wireless devices in the pair of wireless devices, at least one LBT parameter of each wireless device in the pair of wireless devices, or a combination thereof.

10. The apparatus of claim 9, wherein the at least one LBT parameter comprises at least one of: an energy detection (ED) threshold, a preamble detection capability, or a combination thereof.

11. The apparatus of claim 7, wherein the identified LBT silencing criteria comprise at least one of: non-directional LBT silencing criteria, directional LBT silencing criteria, or a combination thereof.

12. The apparatus of claim 7, wherein the wireless communication parameter of the at least one of the wireless devices comprises at least one of: an energy detection (ED) threshold, a transmit power, a usable frequency range, or a combination thereof.

13. A method for wireless communication, comprising:
identifying a shared radio frequency spectrum occupancy parameter for each wireless device in a plurality of wireless devices based at least in part on a percentage of time each wireless device transmits on a shared radio frequency spectrum band;
identifying, for another wireless device outside the plurality of wireless devices, an actual interference value from each wireless device in the plurality of wireless devices, wherein the actual interference value from a wireless device in the plurality of wireless devices is based on the wireless device being in a transmit mode;
determining an average aggregated interference value for the other wireless device outside the plurality of wireless devices based at least in part on the identified shared radio frequency spectrum occupancy parameters and the identified actual interference values; and
selectively adjusting a wireless communication parameter of at least one of the wireless devices, to alter the average aggregated interference value for the other wireless device outside the plurality of wireless devices.

14. The method of claim 13, wherein determining the average aggregated interference value for the other wireless device outside the plurality of wireless devices comprises:
multiplying, for each wireless device in the plurality of wireless devices, the identified shared radio frequency spectrum occupancy for a wireless device and the identified actual interference value from the wireless device to generate a product for the wireless device; and
adding the generated products for the plurality of wireless devices.

15. The method of claim 13, further comprising:
receiving the shared radio frequency spectrum occupancy parameters from the plurality of wireless devices.

16. The method of claim 13, wherein the wireless communication parameter of the at least one of the wireless devices comprises at least one of: an energy detection (ED) threshold, a transmit power, a usable frequency range, or a combination thereof.

17. An apparatus for wireless communication, comprising:
a processor;
memory in electronic communication with the processor; and
instructions stored in the memory, the instructions being executable by the processor to cause the apparatus to:
identify a shared radio frequency spectrum occupancy parameter for each wireless device in a plurality of wireless devices based at least in part on a percentage of time each wireless device transmits on a shared radio frequency spectrum band;
identify, for another wireless device outside the plurality of wireless devices, an actual interference value from each wireless device in the plurality of wireless devices, wherein the actual interference value from a wireless device in the plurality of wireless devices is based on the wireless device being in a transmit mode;
determine an average aggregated interference value for the other wireless device outside the plurality of wireless devices based at least in part on the identified shared radio frequency spectrum occupancy parameters and the identified actual interference values; and
selectively adjust a wireless communication parameter of at least one of the wireless devices, to alter the average aggregated interference value for the other wireless device outside the plurality of wireless devices.

18. The apparatus of claim 17, wherein the instructions executable by the processor to determine the average aggregated interference value for the other wireless device outside the plurality of wireless devices comprise instructions executable by the processor to cause the apparatus to:
multiply, for each wireless device in the plurality of wireless devices, the identified shared radio frequency spectrum occupancy for a wireless device and the identified actual interference value from the wireless device to generate a product for the wireless device; and
add the generated products for the plurality of wireless devices.

19. The apparatus of claim 17, wherein the instructions are executable by the processor to cause the apparatus to:
receive the shared radio frequency spectrum occupancy parameters from the plurality of wireless devices.

20. The apparatus of claim 17, wherein the wireless communication parameter of the at least one of the wireless devices comprises at least one of: an energy detection (ED) threshold, a transmit power, a usable frequency range, or a combination thereof.

* * * * *